Figure 1:
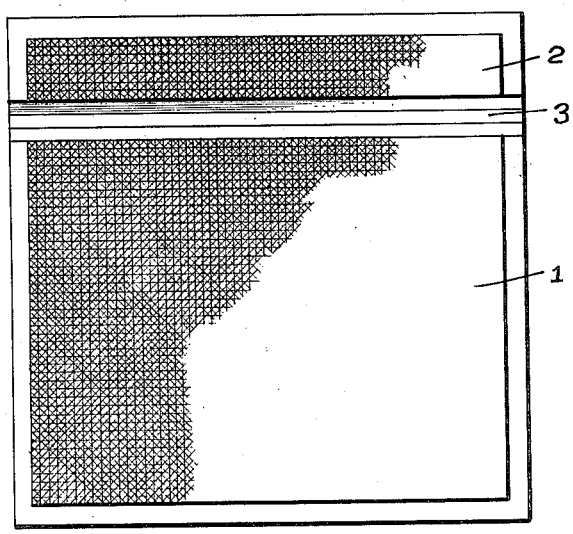

R. H. PHILLIPS.
MAT.
APPLICATION FILED DEC. 12, 1919.

1,422,887.

Patented July 18, 1922.

Inventor
Raymond H. Phillips,
By Emery, Varney, Blair, and Hoguet
Attorneys

UNITED STATES PATENT OFFICE.

RAYMOND H. PHILLIPS, OF TRENTON, NEW JERSEY.

MAT.

1,422,887.   Specification of Letters Patent.   Patented July 18, 1922.

Application filed December 12, 1919. Serial No. 344,286.

*To all whom it may concern:*

Be it known that I, RAYMOND H. PHILLIPS, a citizen of the United States, and a resident of the city of Trenton, county of Mercer, and State of New Jersey, have invented an Improvement in Mats, of which the following is a specification.

My invention relates to mats which are designed to cover two spaces which are not in the same plane and in particular to a mat for covering the running board and the contiguous parts of the dust guard of an automobile and the object of my invention is to produce a mat of this type and for this purpose which will be of improved construction and more satisfactory in use.

Figure 2:
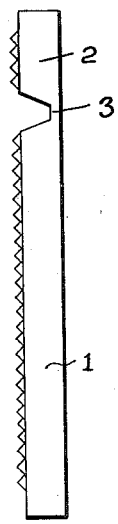
Figure 3:
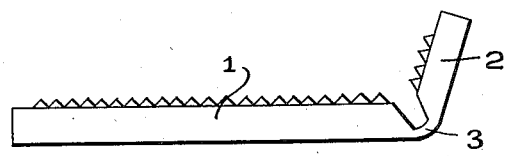

In the drawings accompanying this specification and forming a part thereof, I have shown for purpose of illustration a mat constructed in accordance with my invention and for use with an automobile. In these drawings:

Figure 1 represents a plan view of this illustrative form of mat showing the mat in extending position, Figure 2 represents a side view of the mat in Figure 1, while Figure 3 represents a view similar to Figure 2 showing the mat in bent or operative position.

This illustrative form of my mat comprises a section 1 arranged to lie upon one of the steps to be covered, such as the running board, and a section 2 arranged to lie on the other section to be covered, such as the contiguous portion of the dust guard, and a strip 3 uniting these two sections in a manner to permit relative angular movement between said sections. I may permit such movement by forming the strip 3 of any flexible material but prefer to use resilient material so that the strip 3 not only permits the relative angular movement of the sections 1 and 2 but also acts continuously to move said sections apart angularly to thus hold them tightly against the surfaces which are to be covered. In actual practice I find it convenient to construct the whole mat as a unit and for this reason I prefer to form the strip 3 integral and homogeneous with the sections 1 and 2. This necessitates forming the strip 3 considerably thinner than sections 1 and 2 so as to localize the bend at the strip and also the use of flexible or resilient material for the sections 1 and 2. I find that for certain uses of the mat rubber or a rubber composition is particularly suitable.

There are uses for my mat and advantages therein other than those which are specifically pointed out and there are embodiments and modifications other than those herein illustrated. These uses, advantages, embodiments, and modifications are all embraced in my invention, especially as they may be included in the appended claims.

I claim:

1. A mat for protecting the running board and dust guard of an automobile beneath a door opening comprising a rubber section to be placed on the running board and provided with a roughened top surface, and a second rubber section to be placed in contact with the dust guard, said second section being integrally connected to said first section by a thin strip of rubber joining said first section near its base.

2. A rubber mat for protecting the running board and dust guard of an automobile beneath a door opening comprising a rubber section to be secured to the running board provided with a top tread surface, and a second rubber section to be placed in contact with the dust guard, said mat being reduced in thickness along a line extending transversely of the mat to determine a line of flexure between the two sections, the material of the mat along the line of flexure being distorted from normal condition when the mat is in applied position on the running board whereby the action of the rubber in tending to resume its normal shape will press the second section against the dust guard.

3. A rubber mat for protecting the running board and dust guard of an automobile beneath the door opening, comprising a rubber section to be secured to the running board having an upper tread surface, and a second rubber section to be placed in contact with the dust guard, said mat having a groove on its upper surface between said sections defining a line of flexure, the mat being of a normal shape such that when applied the second section is bent upwardly along the line of flexure and is pressed against the dust guard by the resiliency of the rubber.

In testimony whereof, I have signed my name to this specification this tenth day of December, 1919.

RAYMOND H. PHILLIPS.